Patented May 1, 1951

2,550,746

UNITED STATES PATENT OFFICE 2,550,746

THERMOSETTING COMPOSITIONS COMPRISING AN AMINOPLAST AND ALKYL AMIDINES INCORPORATED THEREIN

Henry P. Wohnsiedler, Darien, and John F. Blais, South Norwalk, Conn., assignors to American Cyanamid Company, New York, N. Y., a corporation of Maine No Drawing. Application June 2, 1947, Serial No. 751,958

7 Claims. (Cl. 260—67.6)

This invention relates to aminoplastics and, more specifically, it is directed to molding and laminating compositions containing an aminoplast having acyl amidines incorporated therein.

Molding and laminating compositions of the amino type, such as urea-aldehyde resins and the aminotriazine-aldehyde resins, particularly the clear unfilled resins of this type, frequently stick to the mold when molded under heat and pressure. Lubricants have therefore been used to provide compositions which did not stick or foul when molded. Previously used lubricants, however, detract markedly from the clarity of the molded article.

It has now been found that a straight-chain amidine such as dicyandiamide, guanylurea, guanidine, biguanides, and the like, when acylated with a fatty acid radical, yield compounds which, when admixed with a thermosetting aminoplast, produce molding compositions which do not stick to the mold or foul the mold when producing molded articles therefrom. A minimum of 0.2% of acyl amidine based on the weight of resin, should be employed for efficient results as a lubricant, and no advantages are obtained by using over 2.0% of the lubricants; in fact, in some cases it is inadvisable to use over 2.0% acyl amidine. It has further been found that a thermosetting melamine molding composition having incorporated therein from about 0.2–0.5% of these acylated amidines, in which the acylating radical is of the higher fatty acid chain, i. e., a carbon atom chain of from about 8–18, the molded articles obtained therefrom are transparent.

The acyl amidines suitable for utility in this invention may be illustrated by the general formula:

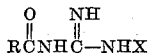

wherein R is an alkyl radical of 7 to 17 carbon atoms, and X represents CN,

or H, and wherein R' may be an alkyl or aryl group but preferably H.

In order to illustrate more fully the acyl amidines employed in this invention, the following methods of preparing some of them are given wholly by way of illustration.

CAPROYL DICYANDIAMIDE

A solution of 84.4 grams of 95% sodium hydroxide in 300 cc. of water was prepared and divided into two equal portions. One part was placed in a three-neck flask equipped with a stirrer, thermometer and two dropping funnels. One hundred twenty-six (126) grams of dicyandiamide and 300 cc. of acetone were added to the caustic soda solution in the flask. The mixture in the flask was stirred and maintained at 20° C., while the second portion of the alkali solution was added simultaneously with 134.5 grams of caproyl chloride. After the addition was completed, the reaction mixture was diluted with water and acidified with acetic acid, whereby a colorless solid was precipitated. The material was filtered, and washed well with water. When dry, the crystals melted at 171–173° C. Crystallization of 103 grams of the product, caproyl dicyandiamide, from 95% ethyl alcohol gave 76 grams of large plate-like crystals which melted at 179°–180° C. Dilution of the filtrate gave an additional crop of crystals weighing 18 grams when dried, and melting at 179°–180° C.

CAPROYL-GUANYLUREA

Thirty-four and four tenths (34.4) parts by weight (0.188 mol) caproyl dicyandiamide was added to 50 parts by weight of water, and 24 parts by weight (0.24 mol) of concentrated hydrochloric acid. The mixture was heated to refluxing temperature, and the clear solution refluxed for several minutes. On cooling, an almost solid cake separated from the solution. After making the reaction mixture alkaline with ammonium hydroxide, the solid was filtered, washed with water, and allowed to dry. The product was dissolved in hot water and recrystallized twice, yielding a product having a decomposition point of 172–173° C.

LAUROYL DICYANDIAMIDE

To a solution containing 66 grams of 85% potassium hydroxide in 200 cc. of water, was added 126 grams of dicyandiamide and 300 cc. of acetone. The mixture was cooled to 20° C., and stirred while 219 grams of lauroyl chloride was slowly added simultaneously with another solution of 66 grams of potassium hydroxide in 100 cc. of water. The mixture was then acidified with acetic acid diluted with water, and the precipitated product filtered as dry as possible. The damp solid was dissolved in hot acetone and a little ethyl ether of ethylene glycol, decolorizing carbon was added and the material filtered. On cooling, glistening, colorless plates separated. A portion of these crystals were dissolved in methyl ethyl ketone, and recrystallized to give plates which melted at 166–167° C.

LAUROYL-GUANYLUREA

Forty (40) parts by weight (0.15 mol) of lauroyl dicyandiamide was added to a mixture of 75 parts by weight of water, and 39 parts by weight of 95% ethyl alcohol, and 20 parts by weight (0.2 mol) concentrated hydrochloric acid. Upon heating the reaction mixture to refluxing temperature, complete solution of the lauroyl dicyandiamide was effected. After refluxing the mixture for 10 minutes, the clear solution was cooled in an ice bath, whereupon an almost solid cake of crystalline hydrochloride salt was obtained. The mixture was made alkaline with ammonium hydroxide, the solid filtered, washed with water and allowed to dry. The crude reaction product thus obtained was recrystallized twice from ethyl alcohol, whereupon a crystalline material having a decomposition temperature of 132° C.–133° C. was obtained.

ADIPYL BIS-DICYANDIAMIDE

To 109 grams of dicyandiamide suspended in a mixture of 150 cc. of water and 400 cc. of acetone, was added 240 cc. of aqueous 50% sodium hydroxide. Ninety-two (92) grams (0.5 mole) of crude adipyl chloride prepared by treating adipic acid with a slight excess of thionyl chloride was added slowly over a period of about one hour, during which time the temperature was maintained at about 5° C., and the reaction mixture was well stirred. The clear solution was then made neutral with hydrochloric acid, and adipyl bis-dicyandiamide was precipitated as a finely divided solid. The product was filtered, washed and dried in a desiccator.

The filtrate from the above precipitation was acidified to a pH of about 3, whereupon δ-carboxy-N-valeryl dicyandiamide was precipitated. The product was filtered, recrystallized from methanol, recovered and dried.

ADIPYL-DIGUANYLUREA

Ten (10) grams of adipyl-bis-dicyandiamide was slowly added to 20 cc. of concentrated hydrochloric acid, with cooling, to keep the temperature at 45° C. The mixture was stirred for ½ hour further, during which time a smooth paste was formed. The paste was then diluted with 400 cc. of warm water, and the solution filtered to remove traces of an insoluble material. The solution was cooled and carefully neutralized with caustic alkali, to a pH of about 5.0; a white micro-crystalline precipitate of adipyl-diguanylurea was formed. The product was filtered, washed and vacuum dried.

(A) *Myristoyl dicyandiamide*
(B) *Myristoyl guanylurea*

A mixture of 330 grams of 85% potassium hydroxide pellets, 336 grams of powdered dicyandiamide, and 3 liters of acetone was stirred vigorously for one hour at room temperature. The mixture was then cooled, and 494 grams of myristoyl chloride were added at such rate that the temperature remained below 10° C. Before all of the acid chloride had been added, the mixture became very thick, and more acetone was added to facilitate stirring. Stirring was continued for one hour, while acetone was added from time to time until a total of 5 liters had been used. The mixture was then diluted with water and neutralized with acetic acid. Myristoyl dicyandiamide was recovered by filtration.

Crude myristoyl dicyandiamide, 177 grams, was added to 0.8 mol of hydrochloric acid in one liter of water, and the mixture refluxed for 15 minutes. The resulting solution was cooled, neutralized with ammonium hydroxide, the free base filtered, and air dried.

(A) *Cocoanut fatty acid dicyandiamide*
(B) *Cocoanut fatty acid guanylurea*

Cocoanut fatty acid dicyandiamide was prepared from 482 grams cocoanut fatty acid chloride, 336 grams of powdered dicyandiamide, and 330 grams of potassium hydroxide in acetone, by following the procedure of the preceding example. One-half of the thick slurry, which contained one mol of the acyl dicyandiamide, was suspended in dilute hydrochloric acid and heated for 10 minutes after a clear solution was obtained. The solution was cooled, neutralized with ammonium hydroxide and filtered. Because of the consistency of the product, filtration was difficult, so the paste was spread on trays and air dried. After several crystallizations from ethyl alcohol, the cocoanut fatty acid guanylurea melted at 114° C.–120° C.

The foregoing examples are merely illustrative of some of the compounds useful in this invention. Other suitable compounds may be prepared, according to the processes disclosed in these examples, by suitable substitution of reactants, and, also, by other well known procedures.

When the term "fatty acid" is used herein, it is used in the generic sense, to refer to both the saturated and unsaturated compounds, rather than the limited chemical definition of saturated compounds only.

The following examples describe procedures for the formation of some resins suitable for utility in this invention.

EXAMPLE 1

Three hundred ten (310) parts of melamine, and 600 parts of a 37% formaldehyde solution were adjusted with sodium hydroxide, and the mixture heated to approximately 75° C., at which point the pH was 7.5. As this temperature is approached, tests are made for hydrophobicity, and when several drops of the solution added to water at 5° C. produce cloudiness, the desired polymerization for hydrophobicity is obtained. This product is suitable as a starting material. To further polymerize the product, the pH is adjusted to 9.5 (glass electrode) with sodium hydroxide, and the syrup concentrated under vacuum with a rising temperature to 115° C. The reaction product was removed from the vessel in a fluid condition, forcibly cooled, and tray dried under reduced pressure.

EXAMPLE 2

A molding resin was prepared by mixing 512 parts 37% formaldehyde solution, 386 parts of melamine at a temperature of 80° F., and adjusted with sodium hydroxide to a pH of approximately 7.0. The slurry was heated to reflux, 30 to 40 minutes being required to raise the temperature to this point; the pH was then checked and adjusted to between 8.0 and 9.0. At this point, the material was slowly cooled to approximately 176° F., and held to that temperature while viscosity tests were made. When the reaction syrup reached a viscosity at 25° C. of 45–50 seconds (Stormer), the syrup was adjusted in pH to approximately 9.5 and spray dried. The spray drying conditions are such as to produce a product which has a viscosity of 21–28 centipoise at 20° C., a pH at 25° C. of 8.5–9.5, and hydrophobicity at 15–25% dilution.

Any of the aminoplast molding compositions may be satisfactorily employed with the acyl amidines of this invention, it being desirable, however, to employ a thermosetting aminoplast which may be molded directly without requiring any preheating. For example, the aminotriazine-aldehyde resins, such as melamine-formaldehyde resins, may be satisfactorily employed. It is advisable, however, to employ a resin of this type having a mol ratio of 1 to 4 mols of aldehyde per mol of melamine, since the higher ratio resins are not particularly suited or adapted for the molding techniques of this invention. Urea molding resins, such as the urea-formaldehyde resins, are particularly useful in practicing this invention.

The aminoplast molding resins may be used with or without additives, such as inert fillers, colorants, curing agents, and the like. These resins may also be used in alkylated form, and admixed or reacted with other resins.

Depending upon utility and workability, it is frequently desirable to employ a plasticizer with the aminoplasts. Any of the standard plasticizers, such as diglycol sebacate, diglycol adipate, cresyl glyceryl ether, etc., may be used to plasticize these aminoplasts when desired. These plasticizers, and other additives may be added at any time, during the aminoplast formation, or when blending with the lubricant to form molding compositions of this invention.

The following examples describe some of the molding compositions of this invention, and a process for producing them.

EXAMPLE 3

A spray dried melamine-formaldehyde resin powder (1:2 molar ratio) was heat-treated to give a molding composition of sufficiently stiff flow to be molded directly without preheating, 2–3 hours at 110° C. being sufficient. This resin and an amount of lauroyl guanylurea, equivalent to 0.2% of the weight of the resin, were charged to a ball mill and milled for approximately three hours. In this way, the lubricant was distributed over the particles of the molding compound, and acted as a film barrier between the plastic and metal mold. Molded articles were made from this composition by molding at 155° C. and 4000 p. s. i. for 5 minutes. The molded articles were easily removable from the mold without sticking, and had excellent appearance, and clarity.

EXAMPLE 4

A spray dried melamine-formaldehyde resin powder was heat-treated to give a molding composition of sufficiently stiff flow to be molded directly without preheating, 2–3 hours at 110° C. being sufficient. This resin and an amount of stearo-guanylurea, equivalent to 0.2% of the weight of the resin, were charged to a ball mill and milled for approximately three hours. Molded articles were made from this composition by molding at 155° C. and 4000 p. s. i. for 10 minutes. The molded articles were easily removable from the mold without sticking, and had excellent appearance.

EXAMPLE 5

A spray dried melamine-formaldehyde resin powder was heat-treated to give a molding composition of sufficiently stiff flow to be molded directly without preheating, 2–3 hours at 110° C. being sufficient. Eighty-five (85) parts by weight of this resin and myristoyl guanylurea, to the extent of .5 part by weight were premixed, then charged to hot differential rolls together with 15 parts diglycol sebacate, and the charge polymerized to molding plasticity. Molded articles were made from this composition by molding at 155° C. and 4000 p. s. i. for 10 minutes. The molded articles were easily removable from the mold without sticking, and had excellent appearance, and clarity.

EXAMPLE 6

A spray dried melamine-formaldehyde resin powder, prepared according to Example 2, was heat-treated to give a molding composition of sufficiently stiff flow to be molded directly without preheating, 2–3 hours at 110° C. being sufficient. This resin and an amount of caproyl guanylurea, equivalent to 0.2% of the weight of the resin, were charged to a ball mill and milled for approximately three hours. Molded articles were made from this composition by molding at 155° C. and 4000 p. s. i. for 5 and 10 minutes. The molded articles were not as readily removable from the mold as compositions containing, for example, lauroyl dicyandiamide, although their appearance and clarity was good.

EXAMPLE 7

A dried melamine-formaldehyde resin powder and an amount of lauroyl dicyandiamide, equivalent to 0.2% of the weight of the resin, were milled on heated rolls of 95° C. slow, and 135° C. fast, for approximately 55 minutes. Molded articles were made from this composition by molding at 155° C. and 4000 p. s. i. for 5 minutes. The molded articles were easily removable from the mold without sticking, and had excellent appearance.

In comparison with the foregoing example, a resin composition containing no added lubricant showed mold sticking.

EXAMPLE 8

A tray dried melamine-formaldehyde resin powder was heat-treated to give a molding composition of sufficiently stiff flow to be molded directly without preheating, 2–3 hours at 110° C. being sufficient. This resin and an amount of stearoyl dicyandiamide, equivalent to 0.2% of the weight of the resin, were charged to a ball mill and milled for approximately three hours. Molded articles were made from this composition by molding at 155° C. and 4000 p. s. i. for 5 minutes. The molded articles were easily removable from the mold without sticking, and had excellent appearance.

EXAMPLE 9

A spray dried melamine-formaldehyde resin powder was heat-treated to give a molding composition of sufficiently stiff flow to be molded directly without preheating, 2–3 hours at 110° C. being sufficient. This resin, 0.2% lauroyl guanylurea and 15% diglycol adipate based on the weight of the resin, were charged to heated differential rolls as in Example 5 and polymerized to molding plasticity. Molded articles were made from this composition by molding at 155° C. and 4000 p. s. i. for 10 minutes. The molded articles were easily removable from the mold without sticking, and had excellent appearance.

EXAMPLE 10

A spray dried melamine-formaldehyde resin powder (1:2 molar ratio) was heat-treated to give a molding composition of sufficiently stiff flow to be molded directly without preheating, 2-3 hours at 110° C. being sufficient. This resin, 0.5% stearoyl guanylurea, and 15% mono orthocresyl glyceryl ether, based on the weight of the resin, were charged to a ball mill and milled for approximately three hours. Molded articles were made from this composition by molding at 155° C. and 4000 p. s. i. for 10 minutes. The molded articles were easily removable from the mold without sticking, and had excellent appearance.

We claim:

1. An unfilled molded article comprising the heat and pressure molded composition comprising a molding melamine-formaldehyde resin, and 0.2% to 0.5% myristoyl guanylurea.

2. An unfilled molded article comprising the heat and pressure molded composition comprising a molding melamine-formaldehyde resin, and 0.2% to 0.5% stearoyl guanylurea.

3. A clear unfilled molded article comprising the heat and pressure molded composition comprising a plasticized melamine-formaldehyde resin, and 0.2% to 0.5% stearoyl guanylurea.

4. An unfilled molding composition comprising a thermosetting aminoplast selected from the group consisting of urea-formaldehyde resins and melamine-formaldehyde resins, and 0.2% to 0.5% of an acyl amidine of the general formula:

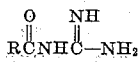

wherein R is an alkyl radical of 7–17 carbon atoms.

5. An unfilled molding composition comprising a thermosetting aminoplast selected from the group consisting of urea-formaldehyde resin and melamine-formaldehyde resin, and 0.2%–2.0% of an acyl amidine based on the weight of aminoplast, said acyl amidine having the general formula:

wherein R represents an alkyl radical of 7 to 17 carbon atoms, and X represents a member selected from the group consisting of CN, H,

and

6. An unfilled molding composition comprising a thermosetting aminoplast selected from the group consisting of urea-formaldehyde resin and melamine-formaldehyde resin, and 0.2%–0.5% of a straight chain acyl amidine based on the weight of aminoplast, said acyl amidine having the general formula:

wherein R represents an alkyl radical of 7 to 17 carbon atoms, and X represents a member selected from the group consisting of CN, H,

and

7. An unfilled molding composition comprising a melamine-formaldehyde molding resin, and 0.2%–0.5% of an acyl amidine, said acyl amidine having the general formula:

wherein R represents an alkyl radical of 7 to 17 carbon atoms, and X represents a member selected from the group consisting of CN, H,

and

HENRY P. WOHNSIEDLER.
JOHN F. BLAIS.

REFERENCES CITED

The following references are of record in the file of this patent:

UNITED STATES PATENTS

| Number | Name | Date |
| --- | --- | --- |
| 2,294,873 | D'Alelio | Sept. 1, 1942 |
| 2,327,772 | D'Alelio | Aug. 24, 1943 |
| 2,331,376 | D'Alelio | Oct. 12, 1943 |
| 2,357,273 | Thurston | Aug. 29, 1944 |
| 2,378,724 | Oldham | June 19, 1945 |